Jan. 29, 1963 T. WATT 3,075,632
FLEXIBLE AND RESILIENT MOUNTING OF TROUGHING
IDLER ROLLERS FOR CONVEYOR BELTS
Filed Oct. 20, 1959 5 Sheets-Sheet 1

Inventor
Thomas Watt
By
Pennie, Edmonds, Morton, Barrows & Taylor
Attorneys

Inventor
Thomas Watt
By
Pennie, Edmonds, Morton, Barrows & Taylor
Attorneys

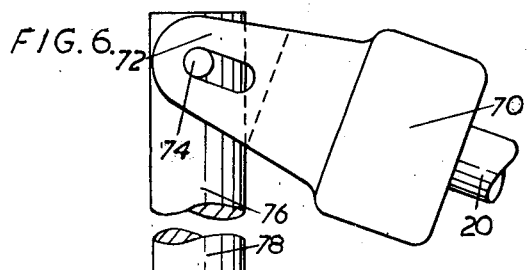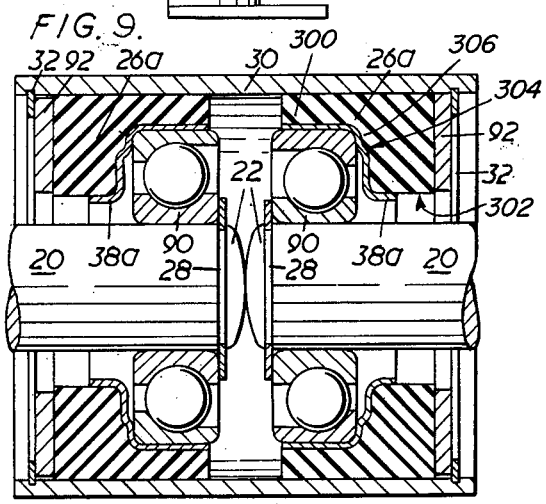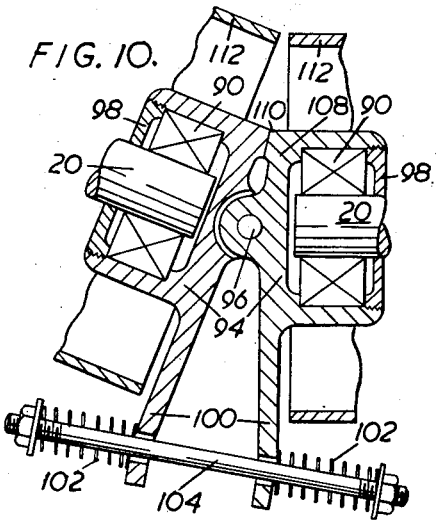

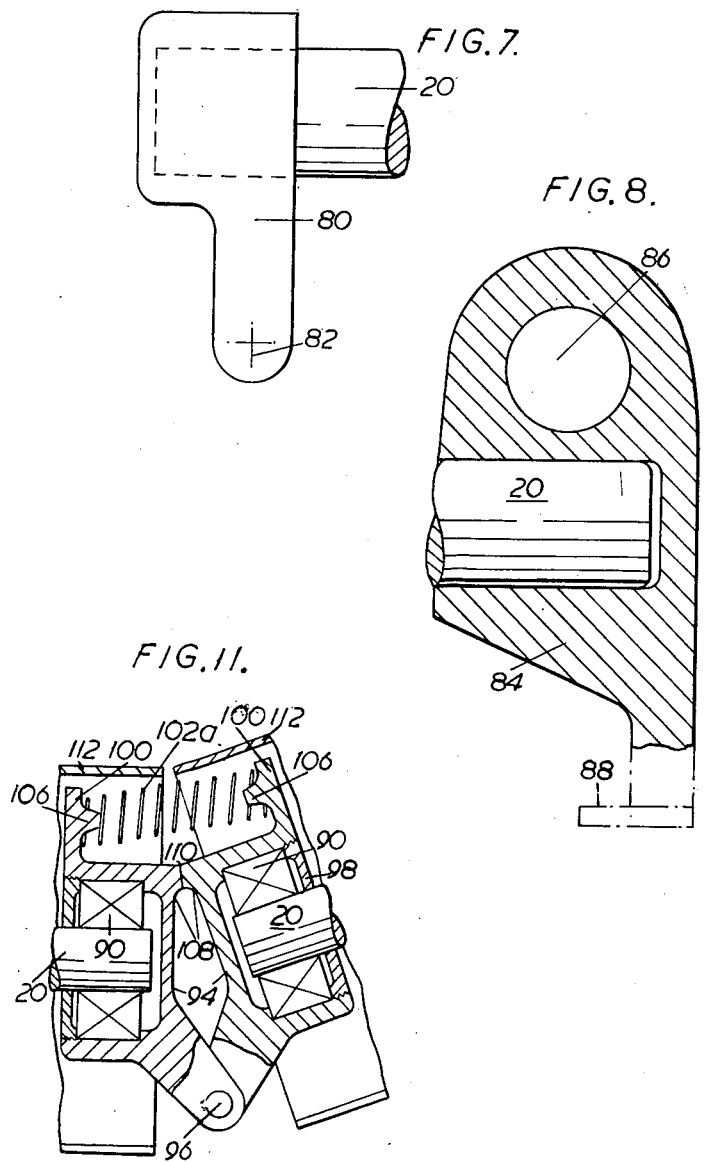

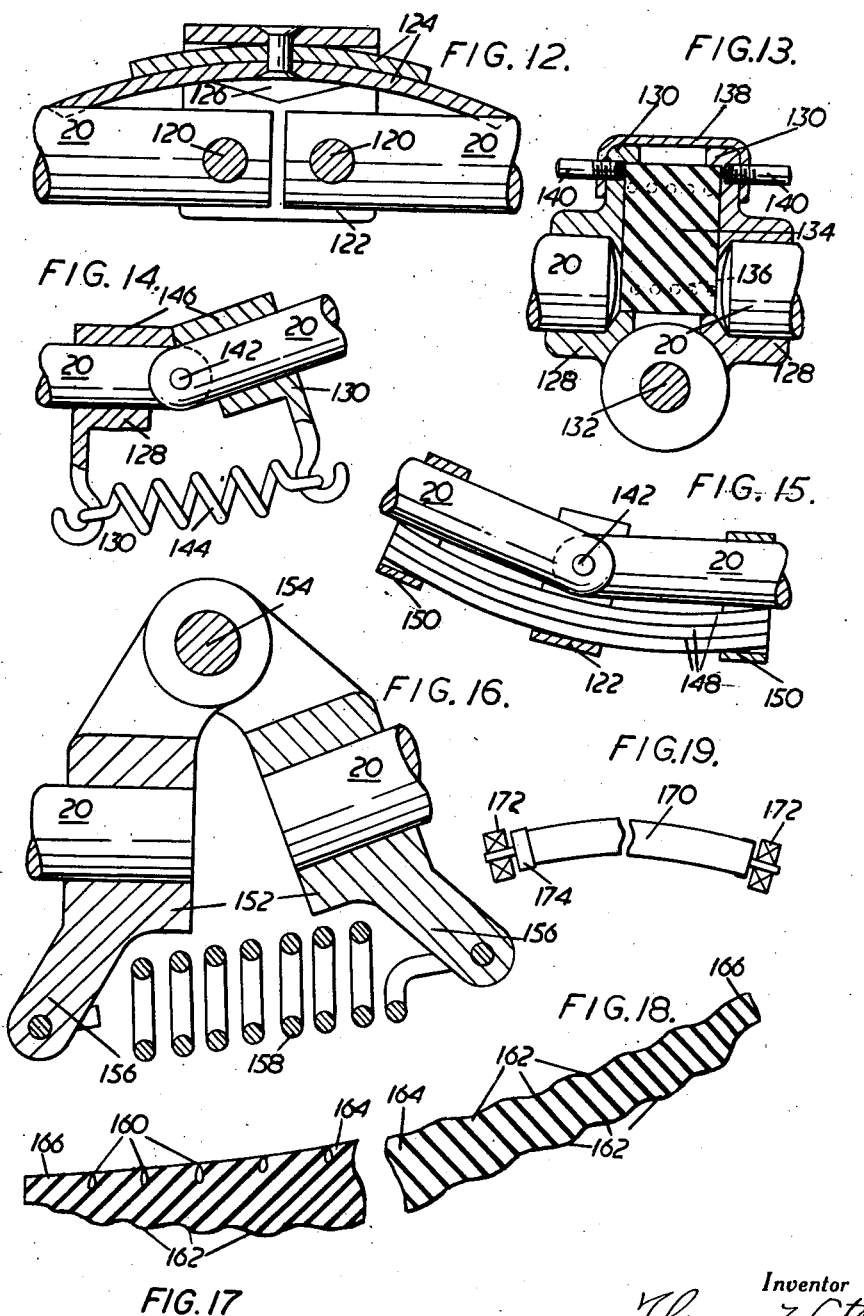

3,075,632
FLEXIBLE AND RESILIENT MOUNTING OF TROUGHING IDLER ROLLERS FOR CONVEYOR BELTS
Thomas Watt, 70 Tenth Ave., Parktown North, Johannesburg, Transvaal Province, Republic of South Africa
Filed Oct. 20, 1959, Ser. No. 847,600
Claims priority, application Republic of South Africa Oct. 23, 1958
11 Claims. (Cl. 198—192)

This invention relates to troughing idlers for conveyor belts, and in particular to idlers providing resilient support to a conveyor belt.

It is an object of this invention to provide deflectable troughing idlers for a conveyor belt, which will support the belt in a flat condition when it is unloaded and in troughed form when it is loaded.

According to the invention, a conveyor belt troughing idler deflectable supporting structure comprises an articulated axle structure having a plurality of axles and laterally spaced joints between adjacent ends of the axles, at least one of the joints being provided with bias means arranged to urge the axles resiliently towards coaxial alignment.

Each joint may be provided with bias means and the axles may be arranged laterally end-to-end in series.

A further feature of the invention provides that the supporting surface of an idler for supporting the conveyor belt, is provided by a roller, also referred to as a support roll, of resiliently flexible material such as rubber, and maintained under lateral end compression, the outer fibres of the roller being under compression even under maximum permissible deflection of the roller surface.

Further features of the invention will become apparent from the following description of specific embodiments given by way of example with reference to the accompanying drawings, and from the claims.

In the drawings like reference numerals refer to like parts, and

FIGURES 5 and 8 show part-sectional side elevations of alternative axle structure end supports;

FIGURES 6 and 7 show part outer side elevations of further alternative axle structure end supports;

FIGURES 9, 10, and 11 show part-sectional side elevations of alternative forms of biased joints where the axles are rotatable;

FIGURES 12 to 16 show part-sectional side elevations of alternative forms of biased joints where rollers are rotatable about the axles;

FIGURES 17 and 18 show part-sectional side elevations of resiliently flexible roller sheaths; and FIGURE 19 shows a sectional side elevation of a return idler.

Figure 1:
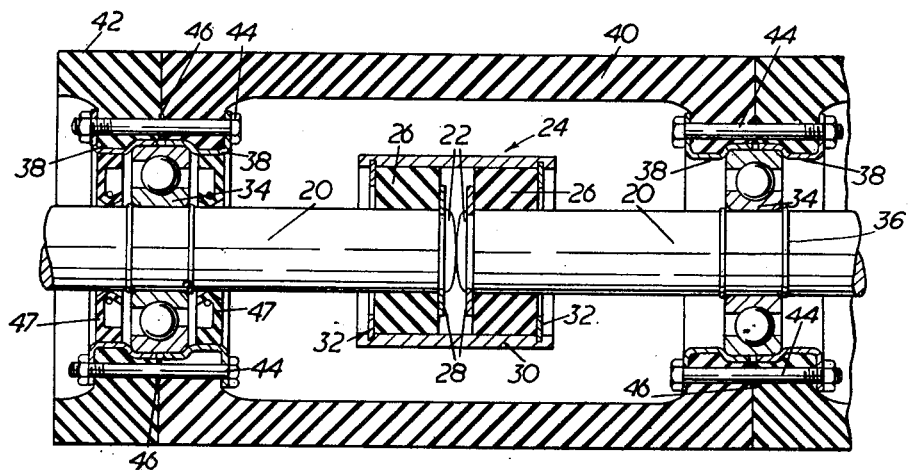
FIGURE 1 shows a part-sectional side elevation of one type of idler.
Figure 2:
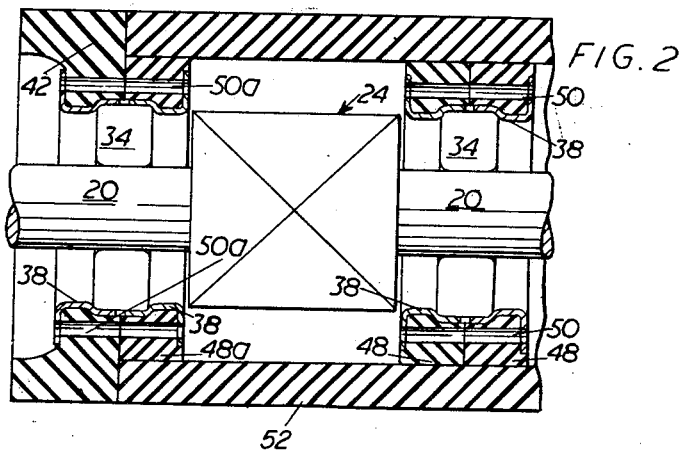
FIGURE 2 shows a part-sectional side elevation of another type of idler.
Figure 5:
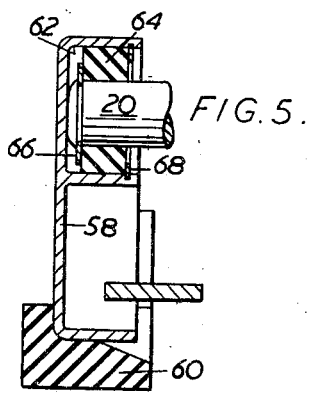

Referring to FIGURES 1, 2, and 5, reference numeral 20 refers to axles included in the axle structure and arranged laterally end-to-end in series, and having rounded ends 22 adapted to abut end on.

The biased joints, generally designated by reference numeral 24, are each comprised of rubber bushes 26 located axially relative to the axles 20 by circlips 28 and to an outer round cylindrical sheath 30 by circlips 32, the bushes 26 being under lateral compression between circlips 28 and 32. The rubber bushes 26 of a joint 24 coact with the axles and the outer sheath 30 to urge the axles 20 towards coaxial alignment. Stop means adapted to limit the axial misalignment of the axles 20 is provided by the abutment of circlips 28 against the inner surface of the sheath 30 and by the abutment of circlips 32 against the outer surface of shafts 20. Depending upon loads expected, suitable contact areas between shafts and circlips will be provided.

Anti-friction locatable rolling bearings 34 (by this term is included suitable ball, roller, and needle bearings) are mounted on the axles 20 and located axially more or less in the middle of the axles by means of circlips 36, (not shown in FIGURE 2).

Referring to FIGURE 1, the bearings 34 are housed in a bore provided by circumferentially split sheet metal linings 38 retained in or bonded to the inner ends of sheath parts 40 of a resiliently flexible material such as rubber, and in or to an end cap 42 of the same material, the sheath parts 40 being secured together laterally under compression in end-to-end relation, and to end caps 42 by bolts 44 which are provided with circlips 46 to retain them in a sheath part 40 for end-to-end assembly. The axial spacing between the bearings 34 is such that the sheath parts are held firmly under compression. Lubricant seals 47 are provided on either side of the end bearing 34.

Referring to FIGURE 2, the bearings 34 are housed in a bore provided by circumferentially split sheet metal linings 38 retained in or bonded to the inner surfaces of rubber rings 48, also referred to as bushes. The bushes 48 are axially compressible by bolts (not shown) passing through holes 50. An end cap 42, having a sheet metal lining 38, is also provided, boltable to an end rubber bush 48a similar to bush 48, by means of bolts (not shown) through holes 50a. A single round cylindrical sheath length 52, of resiliently flexible material such as rubber is compressed laterally end-on between a pair of end caps 42 located axially relative to each other, on the outer axles of the axle structure. Axial compression of the bushes 48 and 48a, causes them to expand radially and to grip the sheath 52 internally.

Figure 3:
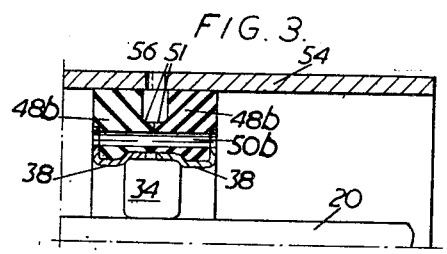
FIGURE 3 shows a part-sectional side elevation of a roller for yet another type of idler.

FIGURE 3 shows the mounting of a cylindrical metal roller 54 on an axle 20 on a bearing 34 through resiliently flexible bushes 48b sheet metal lined with linings 38, the bushes 48b being boltable axially together by bolts (not shown) passing through holes 50b. The bushes are provided with circumferential recesses 51 and the roller 54 with a hole 56. The bearing 34 is located on the axle 20 by circlips (not shown).

Figure 4:
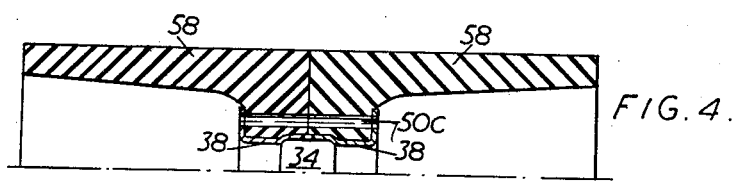
FIGURE 4 shows a part-sectional side elevation of a roller for a yet further type of idler.

FIGURE 4 shows the mounting of a roller of resiliently flexible material and comprised of a pair of circumferentially split halves 58 having sheet metal linings 38, the halves being securable together over a bearing 34 by means of bolts (not shown) passing through holes 50c. The bearing is located on the axle by circlips (not shown).

The axle structure may be variously supported at its ends. A form of support is shown in FIGURE 5 and comprises a pedestal 58 supported on a resiliently flexible base 60, and having a bore 62 housing a resiliently flexible bush 64 and located on axle 20 by means of circlip 66 and in the bore 62 by circlip 68.

A further form of end support is shown in FIGURE 6, in which an axle 20 is mounted to rotate in a bearing (not shown) supported in a member 70 having a clevis tail 72 pivotally supported by pin 74 in pedestal pillar 76 having a foot 78.

A yet further form, shown in FIGURE 7, provides that the axle 20 is axially located relative to the pedestal 80 which is mounted to pivot about an axis 82 transverse to the axis of the axle. This type of support, through its bell crank shape, also acts to limit the deflection of the axle structure under load.

And a yet further form of support provided by a boss 84 within which an axle is rigidly located, is provided with an eye 86 for suspension from a pendant support (not shown). Alternatively, the boss may be provided with a foot 88, for rigid mounting.

FIGURES 9, 10, and 11 show various forms of biased joints between axles, where the axles are rotatably mounted relative to the joints. The joint shown in FIGURE 9 is similar to the biased joint 24, but instead of the bushes 26 being provided engaging directly with the axles 20, there are provided instead bearings 90 end located on the shafts by circlips 28 and housed in resiliently flexible bushes 26a having sheet metal linings 38a, the bushes 26a being axially located in sheath 30 through washers 92 by circlips 32. Stop means limiting axial misalignment is provided by the abutment of the outer surfaces of the axles with washers 92. The metal lining 38a includes a cylindrical portion 300 and radially-extending portions 304 and 306 for receiving the bearings 90. The inner portion of the lining terminates in a cylindrical portion of smaller diameter than the cylindrical portion 300, which lies against a portion of the inner periphery of the bushes 26a. However, the inner cylindrical portion of the liner is less than coextensive with the inner peripheries of the bushes 26a to provides a space 302 to permit free distortion of the bushes as the bushes are subjected to compression resulting from the bearings shifting position upon relative adjustment of the axle sections.

Referring to FIGURES 10 and 11, axles 20 are mounted to rotate in bearings 90 relative to box members 94 pivotally mounted about pin 96. The bearings are covered with cover plates 98. The box members 94 have limbs 100, urged towards coaxial alignment of the axles 20, in the case of the arrangement shown in FIGURE 10 by the action of compression springs 102 disposed around threaded rod 104. In the case of the arrangement shown in FIGURE 11, the bias action is provided by compression spring 102a retained in position by nipples 106 on the limbs 100. The stop means for both forms is provided by shoulders 108 on the limbs abuttable along surface 110. Cylindrical rollers 112 are attached to the axles 20.

The biased joints having stationary axles, may be of various forms. Referring to FIGURE 12, axles 20 are pivotally mounted about pins 120 in yoke 122 carrying riveted leaf spring blades 124 whose ends abut against the axles 20 on either side of the pins 120. Stop means is provided by a shallow V-shaped shoulder 126 adapted to abut against the ends of the axles 20 at the limiting deflection.

Referring to FIGURE 13, box members 128, having limbs 130, are pivotally mounted about pin 132, the box members 128 being rigidly attached to the axles 20, and the limbs being biased apart by a resiliently flexible pad 134 or by a compression spring 136. The maximum outward displacement of the limbs is limited by a straddle 138 held in position by pins 140.

FIGURE 14 shows axles 20 pivotally mounted at their ends about pin 142, and box members 128 rigidly attached to axles 20. Limbs 130 of box members 128 are pulled together by tension spring 144. Shoulders 146 act as stop means. FIGURE 15 shows axles 20 pivotally mounted about pin 142 mounted in yoke 122 straddling leaf spring blades 148 whose ends are received into stirrups 150 provided on each axle. FIGURE 16 shows axles 20 mounted in box members 152 mounted to pivot about pin 154. The members 152 have limbs 156 biased about the pivotal axis by tension spring 158.

FIGURES 17 and 18 show alternative forms of sheaths and sheath parts 52 and 40. FIGURE 17 shows a sheath having axially spaced circumferential grooves 160 in its outer surface and undulations 162 along its inner surface. In operation, in flexing of the sheath, the upper grooves are closed as shown, but the lower ones are open. The sheath has a thicker wall section near its middle 164 than it has at its ends 166.

FIGURE 18 shows a sheath having undulations 162 both along its inner as well as along its outer surface, and also shows the greater wall thickness.

FIGURE 19 shows a conveyor belt return idler having a solid rubber roller 170 mounted to rotate in bearings 172 about upwardly inclined intersecting axes. The bearings are spaced to provide suitable compression of the rubber roller 170 and are tilted to provide the desired bow form. The roller is mounted in stub axle end caps 174.

Conveyor belt troughing idlers can be built up to any standard width by using the standard components shown in FIGURE 1 and also by using the standard components and proper length of sheath shown in FIGURE 2.

The rubber roller materials, where used, are end compressed so as to provide a compressive stress in the outer fibres even when the axle structure is deflected the maximum permissible amount, thus providing improved operational life of the rubber.

Where suitable sealed bearings are available they will be used, thus eliminating lubrication maintenance.

What I claim is:

1. A conveyor belt resilient troughing idler assembly which includes roller means mounted on axle apparatus comprising a plurality of axles in end to end series arrangement, a sleeve disposed around the adjacent end portions of adjacent axles, means for urging said axles toward coaxial alignment including a resilient bush around each of the adjacent end portions of said axles and seated within the sleeve, the bush having a large bore and a smaller bore and a shoulder between the bores, a sheet metal lining within the large bore and having a shoulder between the bores, an anti-friction rolling element bearing within the large bore of the sheet metal lining the bearing having inner and outer races and having its outer race abutting against the shoulder of the sheet metal lining and having its inner race on the axle, bearing inner race locating means at the end of each axle coacting with the axle and with the inner race of the bearing at the end of the axle and limiting the outermost position of the inner race of the bearing on the axle, second locating means within the sleeve for each bush and coacting with the bush and the sleeve and limiting the outermost position of the bush within the sleeve; whereby the resilient bushes may be subjected to axial compression to cause radial expansion within the sleeves by a tensile load applied at the ends of the axle apparatus and whereby the resilient bushes are constrained within the sleeves against radial deformation.

2. A conveyor belt resilient troughing idler assembly which includes roller means mounted on axle apparatus comprising a plurality of axles in end to end series arrangement, the ends of adjacent axles abutting end on, a sleeve disposed around the adjacent end portions of adjacent axles, means for urging said axles toward coaxial alignment including a resilient bush around each of the adjacent end portions of said axles and seated within the sleeve, the bush having a large bore and a smaller bore and a shoulder between the bores, a sheet metal lining within the large bore and having a shoulder between the bores, an anti-friction rolling element bearing within the large bore of the sheet metal lining the bearing having inner and outer races and having its outer race abutting against the shoulder of the sheet metal lining and having its inner race on the axle, bearing inner race locating means at the end of each axle coacting with the axle and with the inner race of the bearing at the end of the axle and limiting the outermost position of the inner race of the bearing on the axle, second locating means within the sleeve for each bush and coacting with the bush and the sleeve and limiting the outermost position of the bush within the sleeve and placing it under axial compression when the axles are in coaxial alignment, whereby the resilient bushes are constrained within the sleeve against radial deformation.

3. A conveyor belt resilient troughing idler assembly which includes roller means mounted on axle apparatus comprising a plurality of axles in end to end series arrangement, a sleeve disposed around the adjacent end portions of adjacent axles, means for urging said axles toward coaxial alignment including a resilient bush around each of the adjacent end portions of said axles and seated within the sleeve, the bush having a large bore and a smaller bore and a shoulder between the bores, a sheet metal lining within the large bore and having a shoulder between the bores, an anti-friction rolling element bearing within the large bore of the sheet metal lining the bearing having inner and outer races and having its outer race abutting against the shoulder of the sheet metal lining and its inner race on the axle, bearing inner race locating means at the end of each axle coacting with the axle and with the inner race of the bearing at the end of the axle and comprising a shaft circlip seating within an annular groove provided at the end of the axle, and limiting the outermost position of the inner race of the bearing on the axle, second locating means within the sleeve for each bush and coacting with the bush and the sleeve and limiting the outermost position of the bush within the sleeve, and comprising a sleeve circlip seating within an annular groove provided in the wall of the sleeve bore, a washer between each bush and coacting sleeve circlip the washer having a bore providing clearance between the washer and the shaft; whereby angular misalignment between the shaft and the sleeve is limited by abutment between the washer and the shaft, and whereby the resilient bushes may be subjected to axial compression to cause radial expansion within the sleeves by a tensile load applied at the ends of the axle apparatus and whereby the resilient bushes are constrained within the sleeves against radial deformation.

4. A conveyor belt resilient troughing idler assembly which includes axle apparatus comprising a plurality of axles in end to end series arrangement, a sleeve disposed around the adjacent end portions of adjacent axles, means for urging said axles towards co-axial alignment including a resilient bush around each of the adjacent end portions of said axles and seated within the sleeve, first locating means at the end of each axle coacting with the axle and with the bush thereon at the end of the axle and limiting the outer position of the bush on the axle and comprising a shaft circlip seating within an annular groove provided at the end of the axle, second locating means within the sleeve for each bush and coacting with the bush and the sleeve and limiting the outermost position of the bush within the sleeve and comprising a sleeve circlip seating within an annular groove provided in the wall of the sleeve bore, there being provided clearance between the outer diameter of the shaft circlip and the wall of the bore of the sleeve, whereby angular misalignment between a shaft and the sleeve is limited by abutment between the shaft circlip and the wall of the bore of the sleeve; and whereby the resilient bushes are constrained within the sleeve against radial deformation; and which includes further an anti-friction rolling element bearing on each axle, said bearing having inner and outer races, inner race locating means locating the inner race of the bearing in the middle portion of the axle, a resilient rubber sheath of circular annular section around the apparatus and comprising a plurality of sheath parts arranged in abutting end to end series relation, each sheath part having an internal shoulder at each end and having a length slightly greater than the axial pitch between adjacent bearings, a sheet metal lining in each end of the sheath part, and connecting means comprising circumferentially spaced axially disposed bolts connecting the ends of the sheath parts together to form a continuous sheath, said bearings being located respectively within the opposing shoulders in the ends of abutting ends of sheath parts; whereby the bushes and the sheath parts are subjected to a degree of axial compression such that under maximum deflection of the axle apparatus permitted by the shaft circlips and sleeve bores, the outer fibres of the bushes and sheath parts remain under axial compression.

5. A conveyor belt resilient troughing idler assembly which includes axle apparatus comprising a plurality of axles in end to end series arrangement, a sleeve disposed around the adjacent end portions of adjacent axles, means for urging said axles towards co-axial alignment including a resilient bush around each of the adjacent end portions of said axles and seated within the sleeve, first locating means at the end of each axle coacting with the axle and with the bush thereon at the end of the axle and limiting the outer position of the bush on the axle and comprising a shaft circlip seating within an annular groove provided at the end of the avle, second locating means within the sleeve for each bush and coacting with the bush and the sleeve and limiting the outermost position of the bush within the sleeve and comprising a sleeve circlip seating within an annular groove provided in the wall of the sleeve bore, there being provided clearance between the outer diameter of the shaft circlip and the wall of the bore of the sleeve, whereby angular misalignment between a shaft and the sleeve is limited by abutment between the shaft circlip and the wall of the bore of the sleeve; and whereby the resilient bushes are constrained within the sleeve against radial deformation; and which includes further an anti-friction rolling element bearing on each axle, said bearing having inner and outer races, locating means locating the inner race of the bearing in the middle portion of the axle; a resilient rubber sheath of circular annular section around the axle apparatus and having a length slightly greater than the axial spacing between the outermost bearings, a pair of resilient grip rings for each bearing, a sheet metal liner having a shoulder lining the bore of each ring, connecting means comprising circumferentially spaced axially disposed bolts connecting the grip rings together, whereby a bearing is located between the opposing shoulders of grip rings and whereby the grip rings expand radially under axial compression of the bolts to grip the sheath internally and at the ends, the outer grip rings at the ends of the sheath being in the form of end caps having larger outer diameters than their mates to provide opposing shoulders between which the sheath is placed under end to end compression to such a degree that under maximum deflection of the axle apparatus permitted by the shaft circlips and sleeve bores, the outer fibres of the sheath remain under axial compression; whereby end compression of the sheath causes a corresponding tensile load on the axle apparatus and hence a compressive load on the bushes within the sleeves to such a degree that under maximum deflection of the axle apparatus the outer fibres of the bushes remain under compression.

6. A conveyor belt resilient troughing idler assembly which includes roller means mounted by roller bearing means on axle apparatus comprising a plurality of axles in end to end series arrangement, each axle having bearing locating means for locating axially in position on it the inner race of at least one anti-friction rolling element bearing for supporting the said roller bearing means, a sleeve disposed around the adjacent end portions of adjacent axles, means for urging said axles towards coaxial alignment including a resilient bush around each of the adjacent end portions of said axles and seated within the sleeve, first locating means at the end of each axle coacting with the axle and with the bush thereon at the end of the axle and limiting the outermost position of the bush on the axle, second locating means within the sleeve for each bush and co-acting with the bush and the sleeve and limiting the outermost position of the bush within the sleeve, and means at opposing ends of the axle apparatus for cooperating with support means whereby the axle apparatus may be supported and whereby a tensile load may be applied to the ends of the axle apparatus, for subjecting the resilient bushes to axial compression to stress them and to cause radial expansion within the sleeves, the resilient bushes being constrained within the sleeves against radial deformation.

7. A conveyor belt resilient troughing idler assembly which includes roller means mounted by roller bearing means on axle apparatus comprising a plurality of axles in end to end series arrangement, each axle having bearing locating means for locating axially in position on it the inner race of at least one anti-friction rolling element bearing for supporting the said roller bearing means, the ends of adjacent axles abutting end on, a sleeve disposed around the adjacent abutting end portions of adjacent axles, means for urging said axles towards coaxial alignment including a resilient bush around each of the adjacent end portions of said axles and seated within the sleeve, first locating means at the end of each axle co-acting with the axle and with the bush thereon at the end of the axle and limiting the outermost position of the bush on the axle, second locating means within the sleeve for each bush and co-acting with the bush and the sleeve and limiting the outermost position of the bush within the sleeve, and means at opposing ends of the axle apparatus for cooperating with support means whereby the axle apparatus may be supported; whereby the bushes within the sleeves are stressed by being placed under axial compression by the abutting ends of the axles and by the first and second locating means, the resilient bushes being constrained within the sleeves against radial deformation.

8. A conveyor belt resilient troughing idler assembly which includes roller means mounted by roller bearing means on axle apparatus comprising a plurality of axles in end to end series arrangement, each axle having bearing locating means for locating axially in position on it the inner race of at least one anti-friction rolling element bearing for supporting the said roller bearing means, a sleeve disposed around the adjacent end portions of adjacent axles, means for urging said axles towards coaxial alignment including a resilient bush around each of the adjacent end portions of said axles and seated within the sleeve, first locating means at the end of each axle co-acting with the axle and with the bush thereon at the end of the axle and limiting the outer position of the bush on the axle and comprising a shaft circlip seating within an annular groove provided at the end of the axle, second locating means within the sleeve for each bush and co-acting with the bush and the sleeve and limiting the outermost position of the bush within the sleeve and comprising a sleeve circlip seating within an annular groove provided in the wall of the sleeve bore, there being provided clearance between the outer diameter of the shaft circlip and the wall of the bore of the sleeve, whereby angular misalignment between a shaft and the sleeve is limited by abutment between the shaft circlip and the wall of the bore of the sleeve, and means at opposing ends of the axle apparatus for cooperating with support means whereby the axle apparatus may be supported and whereby a tensile load may be applied to the ends of the axle apparatus, for subjecting the resilient bushes of the apparatus to axial compression to stress them and to cause radial expansion within the sleeves, the resilient bushes being constrained within the sleeves against further radial deformation.

9. A conveyor belt resilient troughing idler assembly which includes roller means mounted by roller bearing means on axle apparatus comprising a plurality of axles in end to end series arrangement, each axle having bearing locating means for locating axially in position on it the inner race of at least one anti-friction rolling element bearing for supporting the said roller bearing means, a sleeve disposed around the adjacent end portions of adjacent axles, means for urging said axles towards coaxial alignment including a resilient bush around each of the adjacent end portions of said axles and seated within the acting with the axle and with the bush thereon at the end sleeve, first locating means at the end of each axle co-of the axle and limiting the outermost position of the bush on the axle, second locating means within the sleeve for each bush and co-acting with the bush and the sleeve and limiting the outermost position of the bush within the sleeve, and means at opposing ends of the axle apparatus for cooperating with support means whereby the axle apparatus may be supported and whereby a tensile load may be applied to the ends of the axle apparatus, for subjecting the resilient bushes to axial compression to stress them and to cause radial expansion within the sleeves, the resilient bushes being constrained within the sleeves against further radial deformation; and the roller means comprising a tubular rubber sheath around the axle apparatus and located in position on the axle apparatus under initial axial compression whereby under maximum deflection under load, the outer fibres of the tubular rubber sheath still remain under compression.

10. A conveyor belt resilient troughing idler assembly which includes roller means mounted by roller bearing means on axle apparatus comprising a plurality of axles in end to end series arrangement, each axle having bearing locating means for locating axially in position on it the inner race of at least one anti-friction rolling element bearing for supporting the said roller bearing means, the ends of adjacent axles abutting end on, a sleeve disposed around the adjacent abutting end portions of adjacent axles, means for urging said axles towards coaxial alignment including a resilient bush around each of the adjacent end portions of said axles and seated within the sleeve, first locating means at the end of each axle coacting with the axle and with the bush thereon at the end of the axle and limiting the outermost position of the bush on the axle, second locating means within the sleeve for each bush and co-acting with the bush and the sleeve and limiting the outermost position of the bush within the sleeve, and means at opposing ends of the axle apparatus for cooperating wtih support means whereby the axle apparatus may be supported; whereby the bushes within the sleeves are stressed by being placed under axial compression by the abutting ends of the axles, and by the first and the second locating means, the resilient bushes being constrained within the sleeve against radial deformation; and the roller means comprising a tubular sheath around the axle apparatus and located in position on the axle apparatus under initial axial compression whereby under maximum deflection under load, the outer fibres of the tubular rubber sheath still remain under compression.

11. A conveyor belt resilient troughing idler assembly which includes roller means mounted on axle apparatus comprising a plurality of axles in end to end series arrangement, a sleeve disposed around the adjacent end portions of adjacent axles, means for urging said axles toward coaxial alignment including a resilient bush around each of the adjacent end portions of said axles and seated within the sleeve, the bush having a large bore and a small bore and a shoulder between the bores, a sheet metal lining within the large bore and having a shoulder between the bores, an anti-friction rolling element bearing within the large bore of the sheet metal lining the bearing having inner and outer races and having its outer race abutting against the shoulder of the sheet metal lining and having its inner race on the axle, bearing inner race locating means at the end of each axle co-acting with the axle and with the inner race of the bearing at the end of the axle and limiting the outermost position of the inner race of the bearing on the axle, second locating means within the sleeve for each bush and co-acting with the bush and the sleeve and limiting the outermost position of the bush within the sleeve; whereby the resilient bushes may be subjected to axial compression to cause radial expansion within the sleeve by a tensile load applied at the ends of the axle apparatus and whereby the resilient bushes are constrained within the sleeves against radial deformation; and the roller means comprising a tubular rubber sheath around the axle apparatus and located in position on the axle apparatus under initial axial compression whereby under maximum deflection under load, the outer fibres of the tubular rubber sheath still remain under compression.

References Cited in the file of this patent

UNITED STATES PATENTS

| | | |
|---|---|---|
| 909,833 | Vrooman | Jan. 12, 1909 |
| 981,471 | Proal | Jan. 10, 1911 |
| 1,251,135 | Thornley | Dec. 25, 1917 |
| 2,169,624 | Weiss et al. | Aug. 15, 1939 |
| 2,169,625 | Weiss et al. | Aug. 15, 1939 |
| 2,262,325 | Kendall | Nov. 11, 1941 |
| 2,316,509 | Fawick | Apr. 13, 1943 |
| 2,568,174 | Staacke | Sept. 18, 1951 |
| 2,592,831 | Spurgeon et al. | Apr. 15, 1952 |
| 2,593,158 | Lorig | Apr. 15, 1952 |
| 2,632,560 | Wright | Mar. 24, 1953 |
| 2,698,077 | Baechli | Dec. 28, 1954 |
| 2,765,638 | Schaefer | Oct. 9, 1956 |

UNITED STATES PATENT OFFICE
CERTIFICATE OF CORRECTION

Patent No. 3,075,632 January 29, 1963

Thomas Watt

It is hereby certified that error appears in the above numbered patent requiring correction and that the said Letters Patent should read as corrected below.

Column 8, line 2, strike out "acting with the axle and wtih the bush thereon at the end"; line 3, after "co-" insert -- acting with the axle and with the bush thereon at the end --.

Signed and sealed this 3rd day of September 1963.

(SEAL)
Attest:

ERNEST W. SWIDER
Attesting Officer

DAVID L. LADD
Commissioner of Patents